(12) United States Patent  
De Ceuster

(10) Patent No.: US 6,491,332 B2
(45) Date of Patent: Dec. 10, 2002

(54) MOTORIZED CARGO-SPACE COVER FOR MOTOR VEHICLE

(75) Inventor: Peter De Ceuster, Itegem (BE)

(73) Assignee: Peter Butz GmbH & Co. Verwaltungs-KG, Langenfeld (DE)

( * ) Notice: Subject to any disclaimer, the term of this patent is extended or adjusted under 35 U.S.C. 154(b) by 0 days.

(21) Appl. No.: 10/099,884

(22) Filed: Mar. 15, 2002

(65) Prior Publication Data

US 2002/0135198 A1 Sep. 26, 2002

(30) Foreign Application Priority Data

Mar. 20, 2001 (DE) .......................................... 101 13 621

(51) Int. Cl.⁷ ............................................... B60R 5/04
(52) U.S. Cl. ..................... 296/37.16; 296/37.1; 160/24; 160/DIG. 2
(58) Field of Search ............................... 296/37.16, 98, 296/100.18, 100.15, 100.13, 100.11, 37.1, 37.8; 160/265, 266, 270, 272, 273.1, 311, DIG. 2, DIG. 10, 24, 370.22, 84.06

(56) References Cited

U.S. PATENT DOCUMENTS

| 4,795,206 A | * | 1/1989 | Adams ......................... 296/98 |
| 5,538,306 A | * | 7/1996 | Ament ..................... 296/37.16 |
| 5,630,460 A | * | 5/1997 | Yuan .......................... 296/24.1 |
| 5,653,278 A | * | 8/1997 | Cheng ......................... 160/24 |
| 6,003,920 A |   | 12/1999 | Crisp |
| 6,039,105 A | * | 3/2000 | Patmore et al. .......... 296/37.16 |
| 6,213,186 B1 | * | 4/2001 | Torres et al. ............. 296/37.16 |
| 6,349,986 B1 | * | 2/2002 | Seel et al. ............... 296/37.16 |
| 6,416,103 B1 | * | 7/2002 | Laudenbach et al. ...... 296/37.1 |
| 2001/0017194 A1 | * | 8/2001 | Schlecht et al. ........ 160/370.22 |

FOREIGN PATENT DOCUMENTS

| DE | 40 16 707 | 11/1991 |
| DE | 42 00 021 | 7/1993 |
| DE | 100 38 842 | 2/2002 |

* cited by examiner

Primary Examiner—D. Glenn Dayoan
Assistant Examiner—Jason Morrow
(74) Attorney, Agent, or Firm—Herbert Dubno; Andrew Wilford

(57) ABSTRACT

A motor-vehicle cargo-space cover has two rails flanking the space, fixed in the motor vehicle, and defining a pair of slots. A housing releasably mounted in the vehicle and extending transversely of the rails between rear ends if the slots holds a rotatable shaft around which is wound a flexible cover sheet having a front edge provided with a stiffening bar having outer ends carrying respective slides displaceable along the respective slots and into the housing. Respective stiff tapes connected to the slides extend rearward therefrom into the housing to a drive in the housing that pays the tapes out and thereby pushes the slides forward out of the housing into the slots to deploy the sheet over the space and pulls the stiff tapes back into the housing and thereby pulls the slides back and into the housing to retract the sheet from above the space.

20 Claims, 8 Drawing Sheets

MOTORIZED CARGO-SPACE COVER FOR MOTOR VEHICLE

FIELD OF THE INVENTION

The present invention relates to a cargo-space cover for a motor vehicle. More particularly this invention concerns such a cover which has its own motor for the opening and/or closing operation.

BACKGROUND OF THE INVENTION

German patent 100 38 842 of P. Butz describes a motor-vehicle cargo-space cover comprising a pair of rails flanking the space, fixed in the motor vehicle, and defining a pair of slots open toward each other. A housing fixed to ends of the rails extends transversely between their rear ends. A rotatable shaft extends in the housing generally between the slot rear ends and a flexible cover sheet has a rear edge fixed to the shaft and a front edge provided with a stiffening bar having outer ends. Respective slides carried on the bar outer ends are displaceable along the respective slots and into the housing. Thus the outer end of the sheet can be pulled out to deploy the sheet over the cargo space, and can be pushed back in to retract the sheet from above this cargo space. Such a system is effective, but hard to work around and get out of the way, for instance, if the back seat in a station wagon is flopped down to increase the size of the cargo space.

In German 42, 00 021 also of P. Butz the rails are quite short and the outer edge of the cover sheet is pulled completely out to them. The outer ends of the cover-sheet stiffening bar are hooked to special brackets provided in the sides of the vehicle above the cargo space. This arrangement is somewhat hard to use, especially when the sheet is to be retracted.

U.S. Pat. No. 6,003,920 of Crisp has such an arrangement where the slides are each carried on one stretch of a respective endless belt that can be driven by a respective motor back and forth to deploy and retract the sheet. Such an arrangement is very bulky and cannot readily be moved out of the way when the cargo space is to be opened up.

Finally german 40 16 707 of E. Ament has an accordion-folded cover sheet whose slides are carried on longitudinally displaceable drive elements constituted as flexible racks or tapes. This system is also not removable, but instead is a basically one-piece structure that is permanently mounted in the vehicle so that the cargo space cannot be completely opened up without painstaking disassembly of the cover assembly.

OBJECTS OF THE INVENTION

It is therefore an object of the present invention to provide an improved motor-vehicle cargo-space cover.

Another object is the provision of such an improved motor-vehicle cargo-space cover which overcomes the above-given disadvantages, that is which is easy to use, of simple construction, and whose major elements can easily be removed if necessary.

SUMMARY OF THE INVENTION

A motor-vehicle cargo-space cover has according to the invention a pair of rails flanking the space, fixed in the motor vehicle, and defining a pair of slots open toward each other and having open rear ends. A housing releasably mounted in the vehicle and extending transversely of the rails between the slot rear ends holds a rotatable shaft extending in the housing generally between the slot rear ends and around which is wound a flexible cover sheet having a rear edge fixed to the shaft and a front edge provided with a stiffening bar having outer ends carrying respective slides displaceable along the respective slots and into the housing. Respective stiff tapes connected to the slides extend rearward therefrom into the housing. A drive in the housing coupled to the stiff tapes pays them out and thereby pushes the slides forward out of the housing into the slots to deploy the sheet over the space and pulls the stiff tapes back into the housing and thereby pulls the slides back and into the housing to retract the sheet from above the space.

Thus with this system when the cover sheet is retracted, the housing carrying it and the drive can be removed readily. Typically according to the invention ends of the housing are fitted in seats of brackets mounted permanently in sides of the cargo space at the rear ends of the also permanently mounted rails. The housing can be simply lifted out of these seats to remove it and completely clear an entire end of the cargo space. When the brackets are provided at the front of a station-wagon cargo space immediately behind the back seat, the back seat can be flopped down and the housing removed to clear the entire space behind the front seats.

According to the invention the drive includes respective drive wheels coupled to the stiff tapes. The housing has ends holding the wheels and forming guides closely surrounding the respective stiff tapes and extending around the respective wheels. Each guide includes an outlet portion directly aligned with the respective slot. When the sheet is retracted the slides are in the respective outlet portions. This makes the entire housing/drive assembly a neat unit that can easily be lifted out of the permanent brackets.

The guides each include a twisting portion deflecting the respective stiff tape into the housing between the housing ends when the sheet is retracted. The arcuate portion extends around the respective wheel between the respective outlet portion and the respective twisting portion. In addition the housing forms a compartment extending between the housing ends and into which the twisting portions open so that the stiff tapes are held in the compartment when the sheet is retracted. This compartment extends between the housing ends and both stiff tapes are mainly held in it when the sheet is retracted, although it is possible to provide two separate compartments, one for each tape. Each twisting portion has an inlet and an outlet extending at right angles to each other. In addition the stiff tape is flat and of generally rectangular section, normally being made of a stiff plastic.

The tapes in accordance with the invention are each formed with a row of perforations. The drive has respective wheels having bumps engaged in the perforations of the respective tapes. Furthermore each housing end includes an end cap formed with a pair of sockets. The shaft is seated in one of the sockets of each housing end and the drive wheels seated are seated in the other of the sockets of each housing end and drivingly engaging the respective tapes. The drive includes a coupling interconnecting the wheels for joint and synchronous rotation and respective electric motors connected to the drive wheels connected to the respective tapes. The motors are mounted in ends of the housing and each drive motor is reversible. Switches operated by the cover sheet control the motors.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
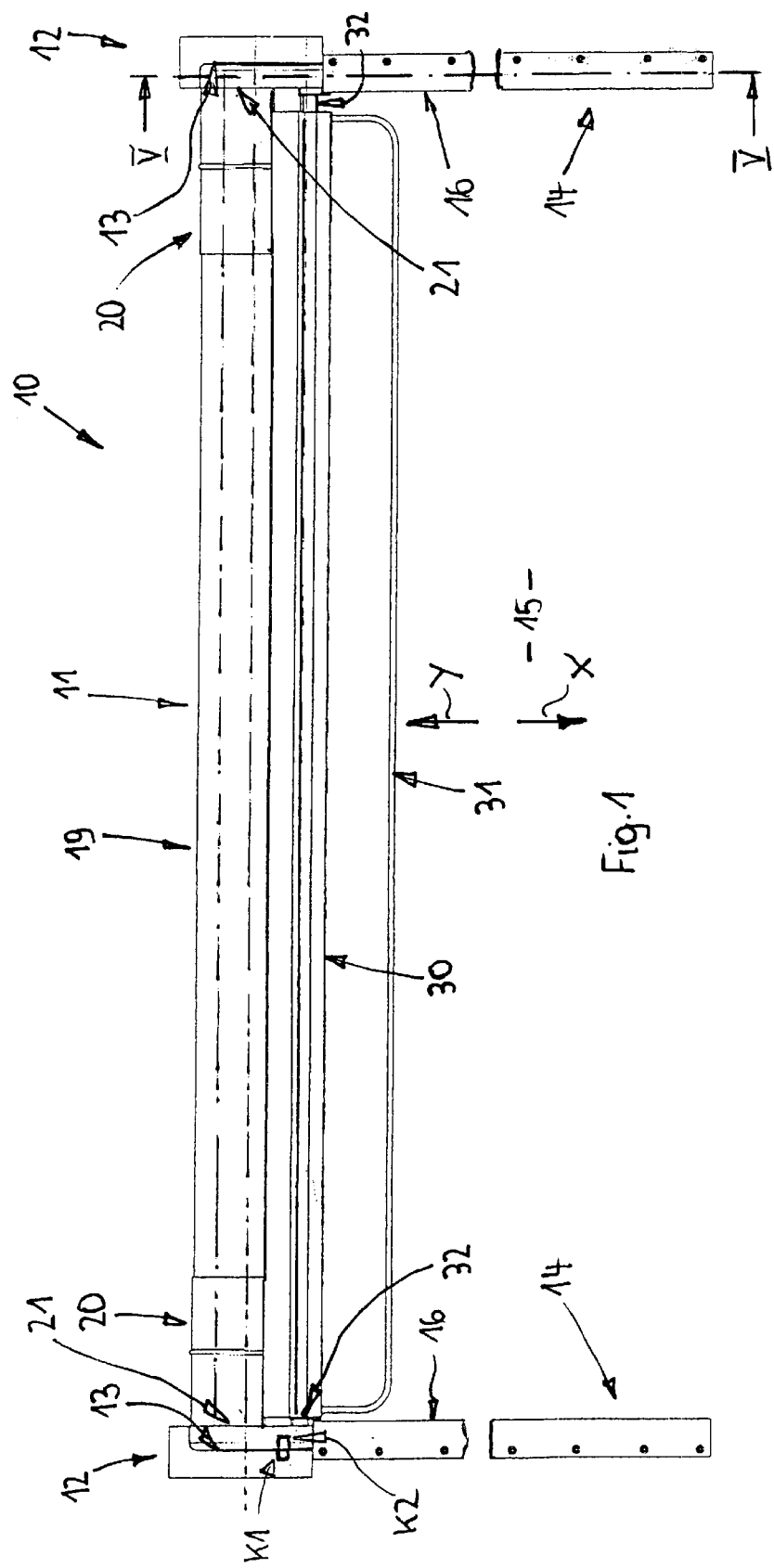
FIG. 1 is a top view of the cover according to the invention.
Figure 2:
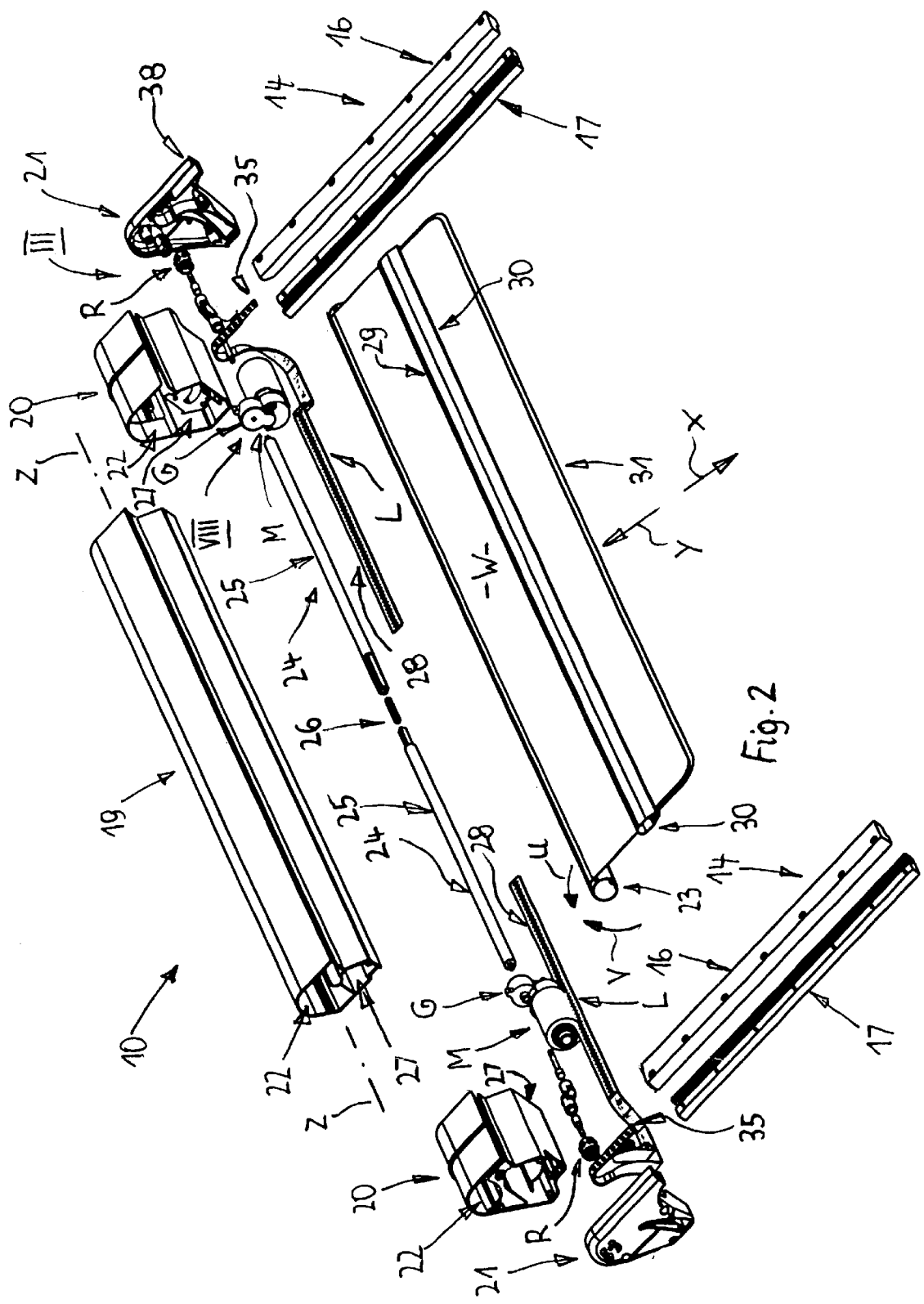
FIG. 2 is a perspective exploded view of the cover.

As seen in FIGS. 1 and 2 the cover 10 according to the invention has an elongated hollow housing 11 held in a pair of bracket fittings 12 fixed in a motor vehicle and having seats 13 into which ends of the housing 11 are set and from which they can be easily lifted. In front relative to a normal travel direction (downward in FIG. 1), of the fittings 12 are a pair of fixedly mounted horizontal guide rails 14 flanking the cargo space 15 of the vehicle, for instance the area behind the back seat. The guide rails 14 each have an upper part 16 and a lower part 17 together of C-section and forming a T-section undercut slot 18 (see FIG. 5), with the two slots 18 extending parallel to each other and open toward each other.

Figure 3:
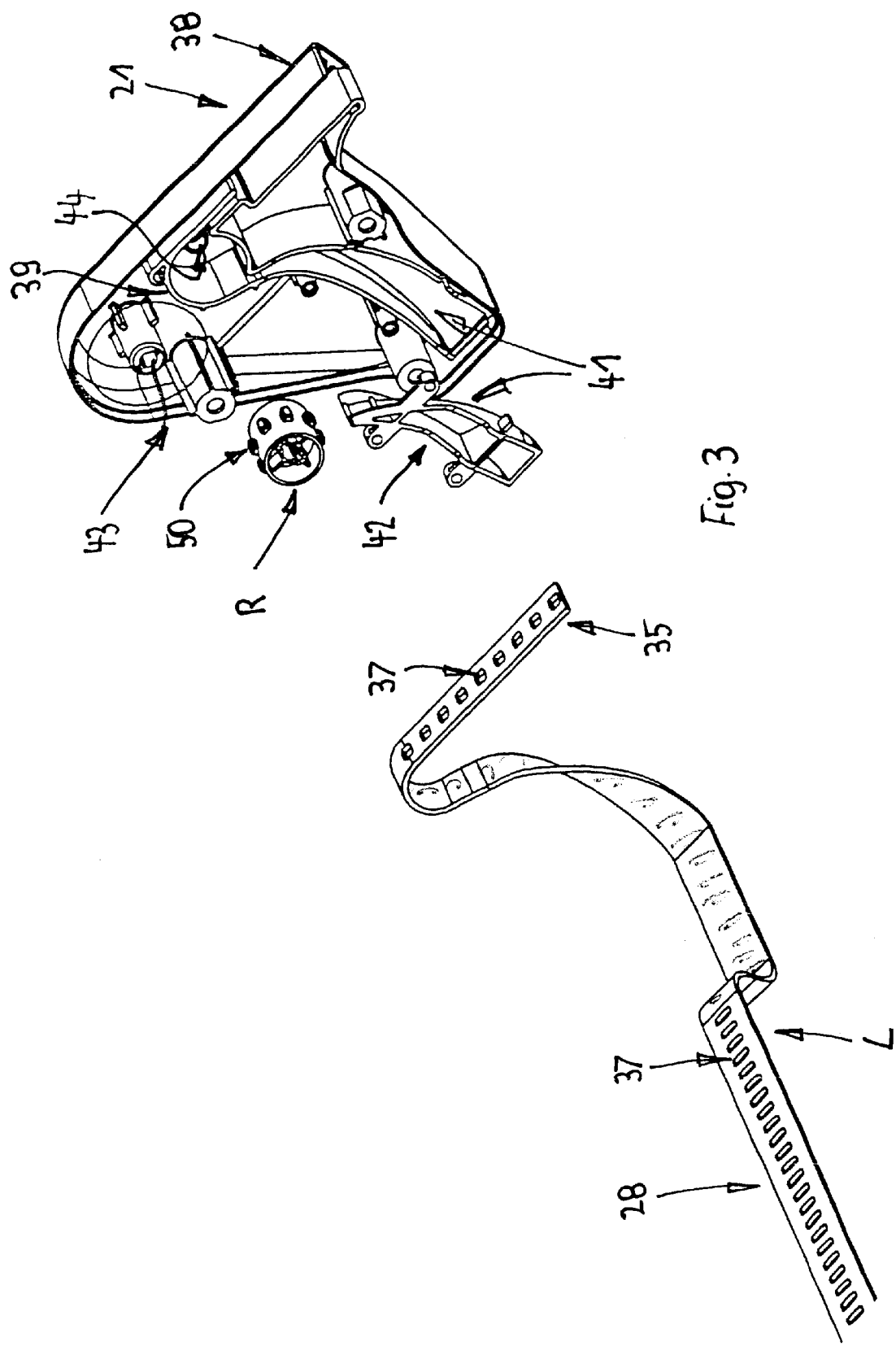
FIG. 3 is a large-scale exploded view of the detail indicated at III in FIG. 2.

The cover housing 11 comprises an elongated tubular central part 19 extending along a transverse direction z and a pair of tubular end parts 20 closed by end caps 21, the latter fitting complementarily and releasably in the upwardly open seats 13. A compartment 22 extending in the direction z through the parts 19 and 20 accommodates a spring shaft 23 on which a cover sheet W is rolled with ends of the shaft 23 fitted in seats 44 (FIG. 3) of the end caps 21. An unillustrated spring in the shaft 23 urges it in a windup direction u opposite an unwind direction v. The sheet W has an outer edge 29 fitted to a stiffening bar 30 to which is secured a cover board 31.

Figure 5:
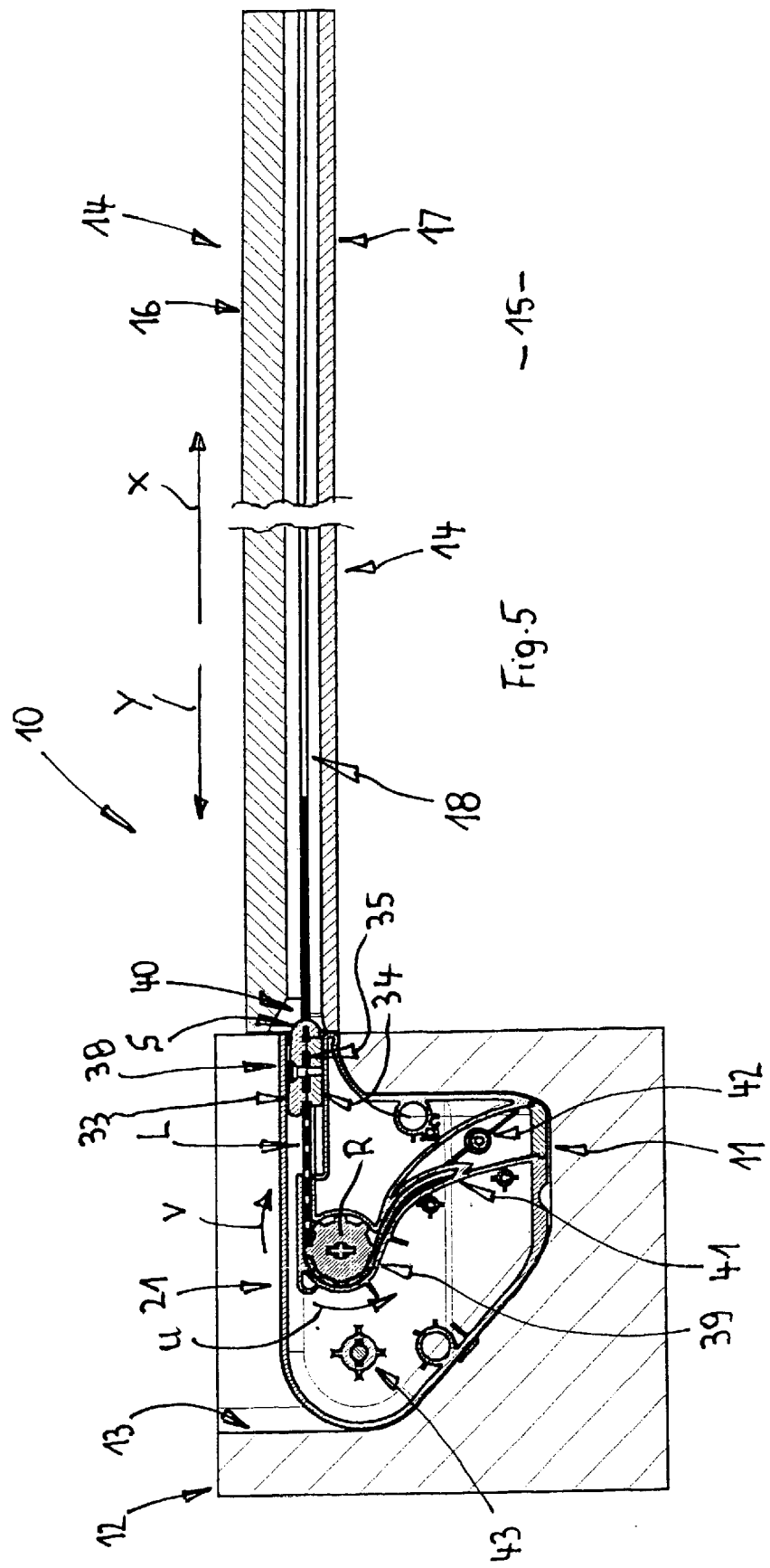
FIG. 5 is a vertical section taken along line V—V of FIG. 1.
Figure 6:
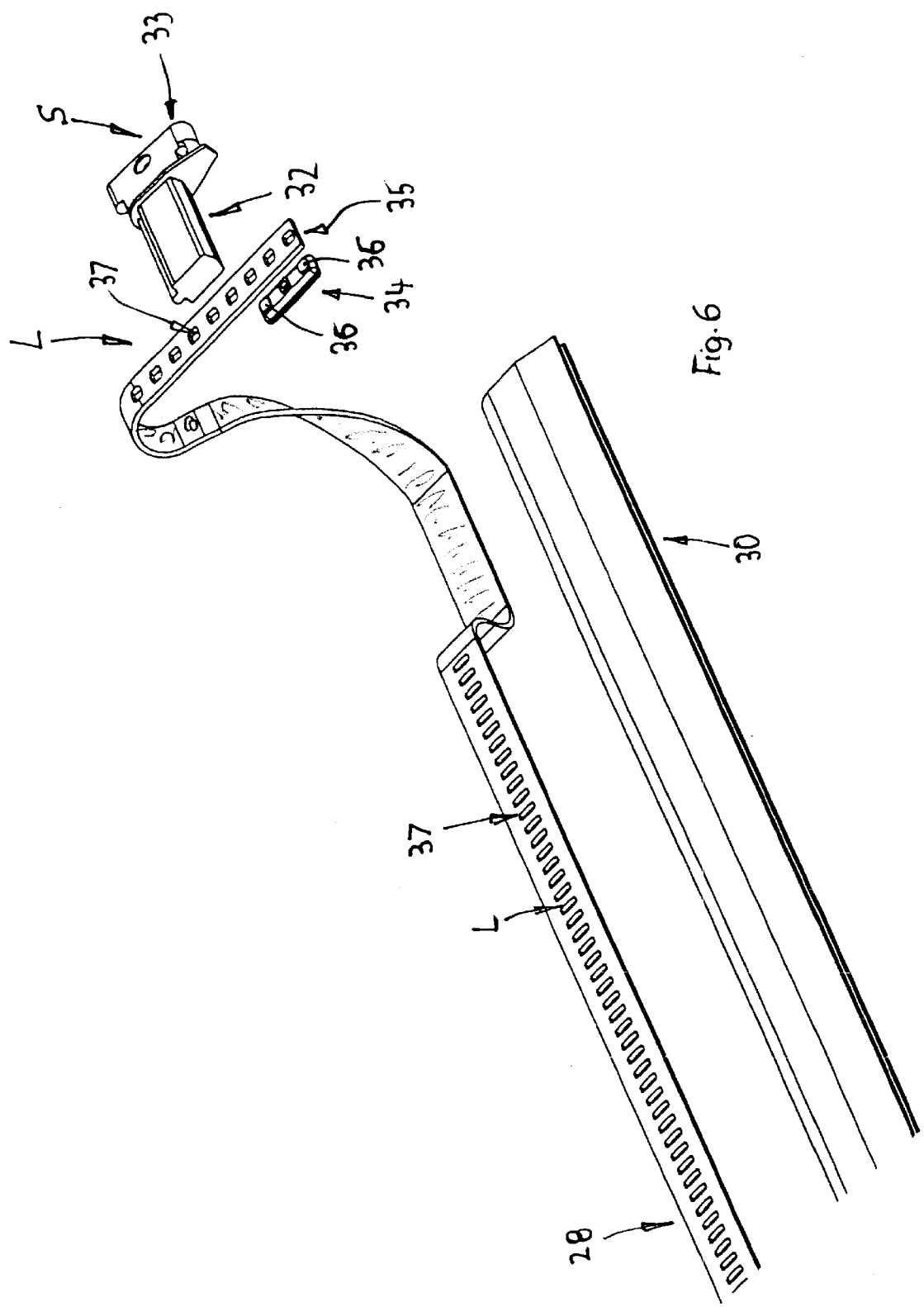
FIG. 6 is an exploded view of a detail of the cover.
Figure 7:
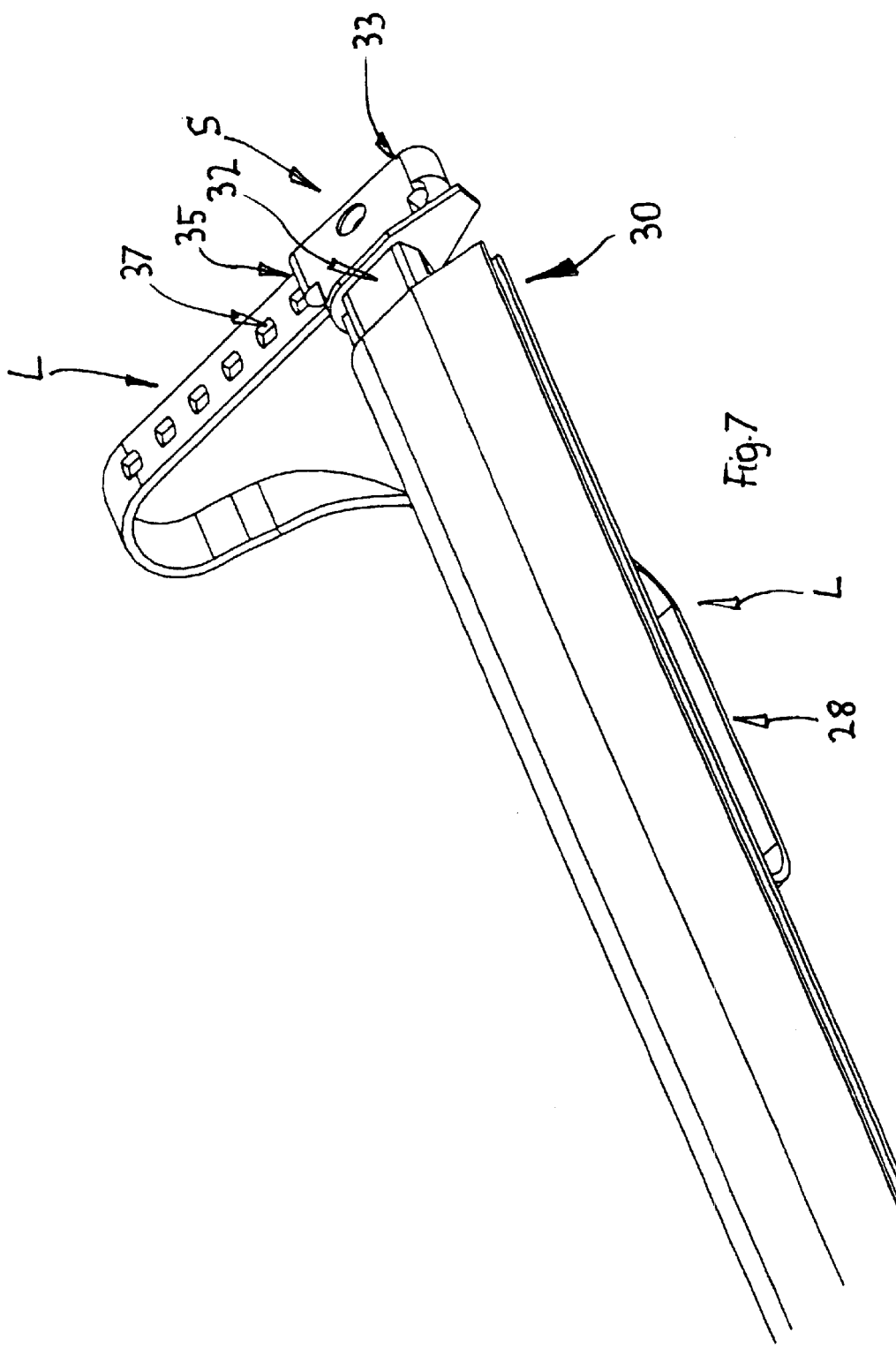
FIG. 7 is the detail of FIG. 6 in assembled condition.

Ends of the bar 31 carry as shown in FIG. 5 and 6 slides S having bodies 33 that ride in the slots 18 and that have extensions 32 fixed to outer ends of the bar 30. A plate 34 having bumps 36 is screwed (FIG. 5) to the bottom of each body 33, locking it to an end 35 of a respective stiff plastic tape L. The bumps 36 project through perforations or holes 37 in the stiff tape L to lock it to the respective slide S.

Figure 4:
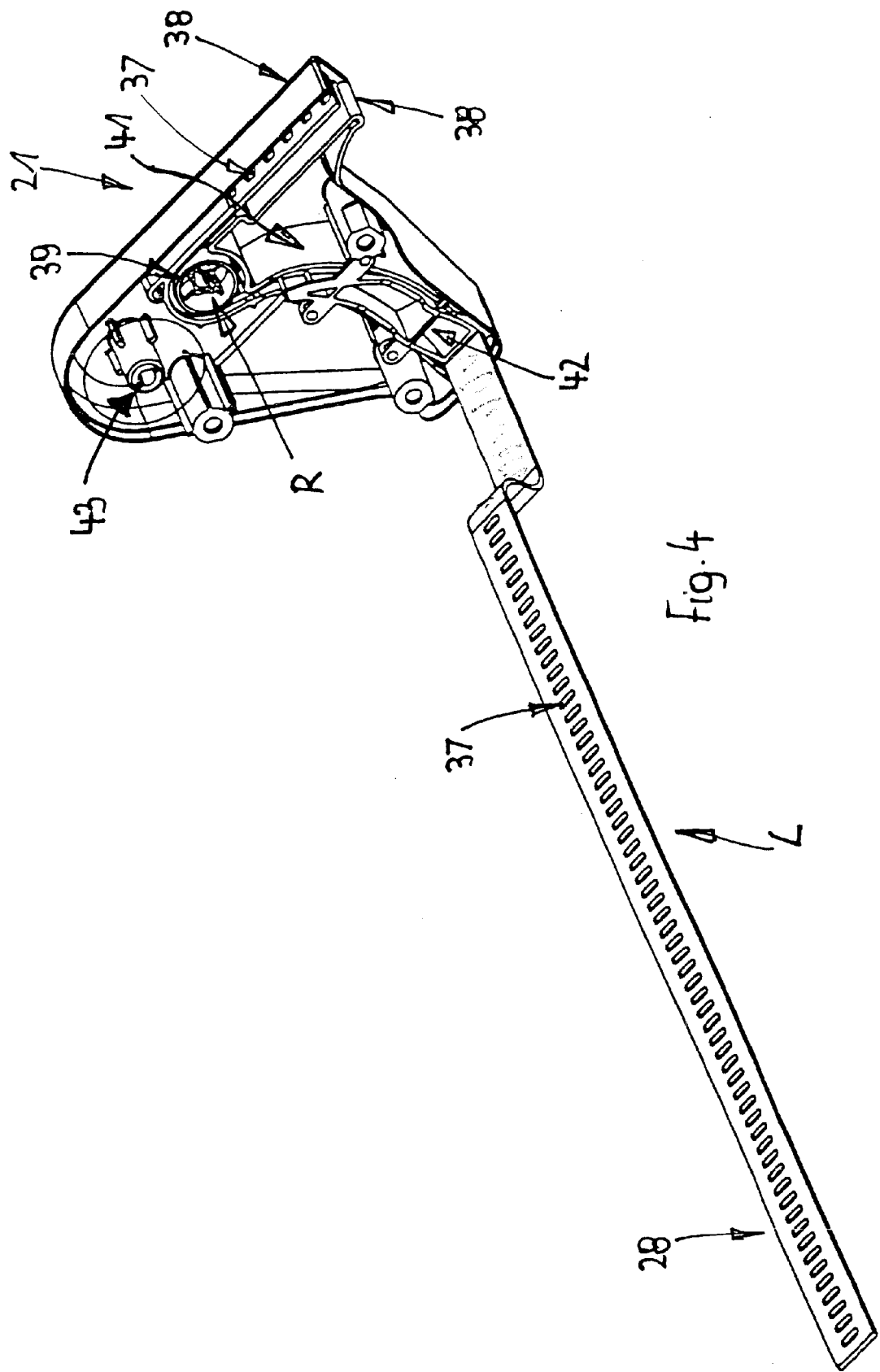
FIG. 4 is the detail of FIG. 3 in assembled condition.

The end caps 21 form respective guides having outlet portions 38 aligned with the rearwardly flared and open rear ends 40 of the slots 13. These guides curve in each end cap 21 at an arcuate portion 39 around a toothed wheel R and then down through a twisting guide structure 41 and 42 (FIG. 3) that opens horizontally into a storage compartment 27 extending in the lower region of the tubular center housing part 19 and in the lower region of the end parts 20 so as to be able to push an end 28 of the tape L thereinto. The wheels R are set in sockets 43 (FIGS. 3 and 4) formed in the end caps 21.

Figure 8:
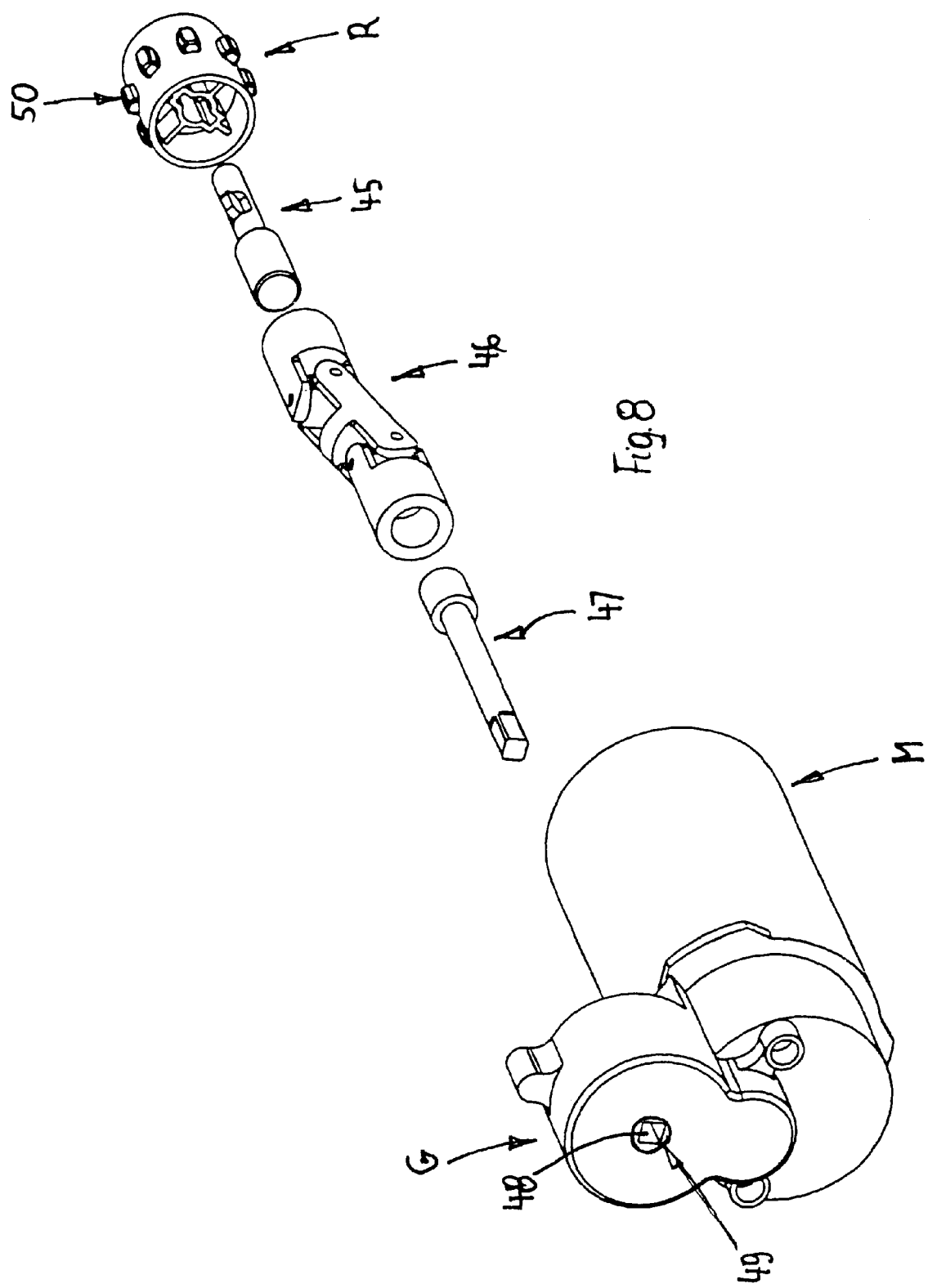
FIG. 8 is an exploded perspective view of another detail of the cover.

Each end part 20 holds a respective reversible electric motor M carrying a respective stepdown transmission G and operated by limit switches K1 and K2 (FIG. 1). A shaft 24 comprised of rods 25 having outer ends seated at 49 (FIG. 8) in sockets 48 in inner faces of the transmissions G and inner ends joined by a splice fitting 26 ensure perfectly synchronous operation of the two motors M and transmissions G. Similar connections on outer faces of the transmissions G fit with inner shafts 47 connected via cardan joints 46 connected via outer shafts 45 to the wheels R. These synchronously rotated wheels R have radially outwardly projecting bumps 50 that fit in the uniformly spaced holes 37 in the tape L where it passes around the arcuate guide portion 39 so that the motors M can extend the ends 35 of the tapes L outward in the deploying direction x (FIG. 2) or pull them back with the spring force in the shaft 23 in the retracting direction y.

The cover 10 operates as follows:

To start with, the entire housing 11 principally formed by the center part 19, end parts 20, and caps 21 sits in the two fittings 12 with the guide slots 38 perfectly aligned with the rearwardly flared rear ends 40 of the guide slots 18. The sheet W is wound up on the shaft 23 and the bar 29 is positioned with the slides S in the guide outlet portions 38. In this position the entire cover 10, except for the permanently mounted rails 14 and the brackets 12, can be lifted out of the vehicle.

To extend the cover sheet W over the cargo space 15, the motors M rotate the wheels R to push the tapes L and sliders S into the rear ends 40 of the guide slots 18. This advances the sheet W across the space 15. The limit switch K2 determines when it is fully deployed and stops the motors M.

To retract the cover sheet W the wheels R are oppositely rotated to pull the slides S back along the rails 18 into the guide portions 38 in the end caps 21. Once this is done, as described above, the housing 11 can be lifted out of the fittings 12.

I claim:

1. In a motor vehicle having a cargo space, a cover comprising:

a pair of rails flanking the space, fixed in the motor vehicle, and defining a pair of slots open toward each other and having open rear ends;

a housing releasably mounted in the vehicle and extending transversely of the rails between the slot rear ends;

a rotatable shaft extending in the housing generally between the slot rear ends;

a flexible cover sheet having a rear edge fixed to the shaft and a front edge provided with a stiffening bar having outer ends;

respective slides carried on the bar outer ends and displaceable along the respective slots and into the housing;

respective stiff tapes connected to the slides and extending rearward therefrom into the housing; and drive means in the housing coupled to the stiff tapes for paying them out and thereby pushing the slides forward out of the housing into the slots to deploy the sheet over the space and for pulling the stiff tapes back into the housing and thereby pulling the slides back and into the housing to retract the sheet from above the space.

2. The motor-vehicle cargo-space cover defined in claim 1 wherein the drive means includes respective drive wheels coupled to the stiff tapes.

3. The motor-vehicle cargo-space cover defined in claim 2 wherein the housing has ends holding the wheels and forming guides closely surrounding the respective stiff tapes and extending around the respective wheels.

4. The motor-vehicle cargo-space cover defined in claim 3 wherein each guide includes an outlet portion directly aligned with the respective slot.

5. The motor-vehicle cargo-space cover defined in claim 4 wherein when the sheet is retracted the slides are in the respective outlet portions.

6. The motor-vehicle cargo-space cover defined in claim 4 wherein the guides each include a twisting portion deflecting the respective stiff tape into the housing between the housing ends when the sheet is retracted.

7. The motor-vehicle cargo-space cover defined in claim 6 wherein the guides each include an arcuate portion extending around the respective wheel between the respective outlet portion and the respective twisting portion.

8. The motor-vehicle cargo-space cover defined in claim 6 wherein the housing includes a compartment extending between the housing ends and into which the twisting portions open, whereby the stiff tapes are held in the compartment when the sheet is retracted.

9. The motor-vehicle cargo-space cover defined in claim 8 wherein the compartment extends between the housing ends and both stiff tapes are mainly held in it when the sheet is retracted.

10. The motor-vehicle cargo-space cover defined in claim 6 wherein each twisting portion has an inlet and an outlet extending at right angles to each other.

11. The motor-vehicle cargo-space cover defined in claim 1 wherein the stiff tape is flat and of generally rectangular section.

12. The motor-vehicle cargo-space cover defined in claim 1 wherein the tapes are each formed with a row of perforations, the drive means including respective wheels having bumps engaged in the perforations of the respective tapes.

13. The motor-vehicle cargo-space cover defined in claim 1 wherein each housing end includes an end cap formed with a pair of sockets, the shaft seated in one of the sockets of each housing end, the drive means including respective wheels seated in the other of the sockets of each housing end and drivingly engaging the respective tapes.

14. The motor-vehicle cargo-space cover defined in claim 13 wherein the drive means includes coupling means interconnecting the wheels for joint and synchronous rotation.

15. The motor-vehicle cargo-space cover defined in claim 1 wherein the drive means includes respective electric motors and respective drive wheels rotated by the motors and connected to the respective tapes.

16. The motor-vehicle cargo-space cover defined in claim 15 wherein the drive means includes coupling means interconnecting the wheels for joint and synchronous rotation.

17. The motor-vehicle cargo-space cover defined in claim 15 wherein the motors are mounted in ends of the housing.

18. The motor-vehicle cargo-space cover defined in claim 15 wherein each drive motor is reversible.

19. The motor-vehicle cargo-space cover defined in claim 15 wherein the drive means includes switches operated by the cover sheet for controlling the motors.

20. The motor-vehicle cargo-space cover defined in claim 1, further comprising brackets permanently mounted in the vehicle to either side of the cargo space at the rear slot ends and each formed with a seat adapted to releasably receive a respective end of the housing.

* * * * *